March 28, 1961   E. F. ANDREWS   2,976,935
JET DRIVE ROTARY WING SYSTEM
Original Filed Dec. 29, 1941   5 Sheets-Sheet 1

INVENTOR.
Edward F. Andrews
BY Horton, Davis,
Brewer & Brugman
Atty's.

March 28, 1961  E. F. ANDREWS  2,976,935
JET DRIVE ROTARY WING SYSTEM
Original Filed Dec. 29, 1941  5 Sheets-Sheet 2

INVENTOR.
Edward F. Andrews
BY Horton, Davis,
Brewer & Brugman
Attys.

March 28, 1961   E. F. ANDREWS   2,976,935
JET DRIVE ROTARY WING SYSTEM
Original Filed Dec. 29, 1941   5 Sheets-Sheet 4

INVENTOR.
Edward F. Andrews
BY Horton, Davis,
Brewer & Brugman
Attys

United States Patent Office 2,976,935
Patented Mar. 28, 1961

2,976,935

JET DRIVE ROTARY WING SYSTEM

Edward F. Andrews, 105 15th St., Belleair Beach, Fla.

Original application Dec. 29, 1941, Ser. No. 424,756, now Patent No. 2,511,687, dated June 13, 1950. Divided and this application June 4, 1957, Ser. No. 663,503

9 Claims. (Cl. 170—135.4)

This application is a division of my application, Ser. No. 355,817 filed May 18, 1953, now Patent No. 2,799,353, and of my application Ser. No. 121,600 filed October 15, 1949, now Patent No. 2,797,881, and of my application, Ser. No. 424,756 filed December 29, 1941 and issued June 13, 1950 as Patent No. 2,511,687.

This invention relates to aircraft and is more particularly concerned with what I call a rotating wing composite aircraft. The invention also is concerned with improvements relating to composite aircraft, to airplanes and to rotating wing aircraft, particularly helicopers.

The phrase, composite aircraft, as used in this specification, means an aircraft having two separable parts or components capable of controlled flight when connected together as a single unit and also in which at least one of the components is capable of controlled flight after the components are separated from each other in the air.

In the case of a rotating wing composite aircraft, the upper or assist take-off component is provided with a rotating wing or rotor and will be called the rotor component, while the lower component is provided with a propeller and a fixed wing and will be referred to as the airplane component. The rotor component is secured above the airplane component for take-off and provides the principal take-off lift. After take-off and at a suitable altitude, the airplane component separates from the rotor component and proceeds on its mission alone, while the rotor component returns and lands at its base. Thus, the advantages of a rotor are provided for a take-off and low speed flight without the disadvantages associated with a rotor during high speed flight.

Further, the airplane component may be designed solely best to meet the conditions of high speed flight without being burdened by additional surface or apparatus normally required only for landing and slow speed flight. The advantages of a rotating wing or rotor for take-off and a high aspect ratio fixed wing of small area and low drag for high speed flight are set forth in my Patents Nos. 2,330,803 and 2,329,814. Because a power driven rotating wing or rotor is capable of a substantially vertical take-off without forward run, landing gear of the conventional type, may be dispensed with if desired. Thus, the airplane component may land upon a simple central skid assisted by wing balancing skids. This arrangement avoids complications of design occasioned by the alighting gear, saves the space required for its retraction, and avoids dead weight. Likewise, the wing area can be reduced to the minimum required for efficient high speed flight without necessitating surplus wing and control surface area useful only for landing and detrimental at high speed.

By employment of the rotor component for take-off, an airplane is provided which will carry a much heavier load with any given size of wing. Because a large part of the load may be eliminated by the consumption of the fuel and by the discharge of cargo, the wing loading is very substantially reduced before landing. Such loads as mail, freight, parachute troops or bombs, may be discharged without landing the airplane. The rotor component not only permits increased wing loading, but also adapts the aircraft to take-off from any small, clear space, regardless of the surface roughness, thus freeing the aircraft from dependence upon large, smooth airports.

In one embodiment of my invention, to be described subsequently, I have shown a single engined highly loaded airplane having relatively small wings of high aspect ratio. This airplane is not equipped with conventional landing gear, but rather lands upon a skid which may be formed integrally with the lower portion of the fuselage. The airplane is prevented from dragging either of its wings by retractable wing skids which are extended from the lower surfaces of the wings prior to contact of the airplane with the ground. It will be appreciated that the cost of providing this type of landing arrangement and the weight it adds to the aircraft will be comparatively slight when contrasted with conventional landing gears. It should be understood, however, that additional landing gear may be provided, if desired. The airplane I have shown accommodates a crew of two, both of whom are located near the rear of the fuselage, while the space adjacent the center of gravity is reserved for fuel, bombs or other variable load.

The airplane component is assisted in its take-off by means of a rotor component which is attached to the airplane component and which need carry only a pilot. In one embodiment of my invention, the rotor blades are set at about the angle of least drag and are rotated above normal speed by the engine in the airplane component. After considerable overspeed of the rotor has been attained, the engine is disconnected from the rotor or delivers only reduced power thereto, and by increasing the angle of incidence of the rotor blades, a jump take-off in a more or less vertical direction is made. From this point on, the composite aircraft may be flown substantially as an autogyro until it has attained a desired altitude and a forward speed sufficient to maintain the airplane component in flight without the help of the rotor component. At this point the rotor component may be disconnected from the airplane component and the latter proceeds on its mission, while the pilot in the rotor component returns to the field in a glide without power.

When the airplane component returns from its mission, it may be landed upon the lower surface of the fuselage and the wing skids previously mentioned. In order to prevent damage to the two bladed propeller, the motor is stopped and by means of the engine starter or other appropriate mechanism not shown, the aircraft propeller is positioned horizontally. If the aircraft is intended to take-off directly from the ground, that is without being supported upon a wheeled truck or the like, a clutch should be provided to disconnect the propeller from the engine, so that the engine can be used for driving the rotor blades without revolving the propeller. If an alighting gear is provided which furnishes ground clearance for the propeller, the clutch and the means for stopping the propeller in a horizontal position are not required.

It will be understood that other embodiments and arrangements of this invention may be employed, as well as the embodiment first above described. For instance, the rotor component may contain its own power plant which operates the rotor both while the two components are connected to form a complete composite aircraft and also after the rotor component has separated from the airplane component. The embodiment shown in Figs. 6, 7, and 8 may be employed for this purpose with slight modifications for appropriate attachment to the airplane component. Also, the embodiment shown in Figs. 9 and 10 may be incorporated into the embodiment shown in Figs. 1, 2, and 3. A conventional retractable alighting gear may be provided for the airplane component, if desired. The rotor component may also be equipped with a suitable alighting gear for supporting itself and also the airplane component. Other forms of suitable rotor, hub, and control mechanism, may also be employed instead of the one illustrated in detail in Figs. 4 and 5.

It is an object of my invention to provide a composite aircraft having an assist take-off component capable of raising the composite aircraft into the air with little or no preliminary horizontal run.

A more specific object of my invention is to provide a composite aircraft having a component provided with a rotor or rotating wing which can be completely separated from the airplane component after take-off has been effected.

A further object is to provide a composite aircraft composed of a rotor component, the rotor of which is capable of high lift at zero or low forward speed, and an airplane component having a very low drag, small area wing, capable of carrying a very large load at high speed.

A further object is to provide a composite aircraft having a rotor component and an airplane component and means for driving the rotor component from the power plant of the airplane component.

A further object is to provide an energy storage system for driving a rotor by jet reaction, particularly one suitable to the needs of the rotor component herein described.

A further object is to provide a helicopter, capable of independent use or use as a rotor component, and having novel control means, including means for overcoming the torque reaction under various conditions of flight.

A further object is to provide a novel form of rotor hub and rotor control mechanism for rotating wing aircraft of different types, that is, either power driven or autorotating.

A further object is to provide a rotor having blade feathering control apparatus capable of imparting special pitch change characteristics with backward and forward movement of the blades in a plane perpendicular to the axis of rotation.

Another object is to provide take-off, landing gear, rotor and propeller clutch mechanism, and attachment and disengaging gear suited to the needs of the rotating wing composite aircraft herein described.

A further object is to provide jet propulsion means for driving a rotating wing which can be caused to be effective only on the blades of a rotor which are moving forward relative to the direction of movement of the rotor as a whole in the general direction of the plane of rotation.

A further object is to provide a novel helicopter having a single main lifting rotor, the fuselage of the helicopter being equipped with a torque compensating device operated by the slip-stream of said rotor and being further equipped with a power driven variable pitch propeller, the thrust of which directly opposes the torque reaction.

A further object is to provide a novel composite rotating wing aircraft having a motor driven rotor and a motor driven device for neutralizing the torque reaction of said rotor.

A further object is to provide a novel composite aircraft having an airplane component equipped with a propeller and motor, and a rotor component having a rotor and a torque compensating propeller, both of which are driven by the motor of the airplane component.

A further object is to provide a novel helicopter having a single main power driven lifting rotor, the angle of the blades of said rotor being differentially and periodically variable to provide roll and pitch control for said helicopter, and a power driven propeller, the thrust of which directly opposes the torque reaction of said rotor to provide torque compensation and yaw control for said helicopter.

Other objects and advantages will become apparent from the accompanying drawings and the following description of several alternate structures embodying features of my invention.

In the drawings, in which similar characters of reference refer to similar parts throughout the several views:

Fig. 5a is a fractional sectional view of a modification adapted to be substituted for a portion of the apparatus shown in Fig. 5;

Figure 1:
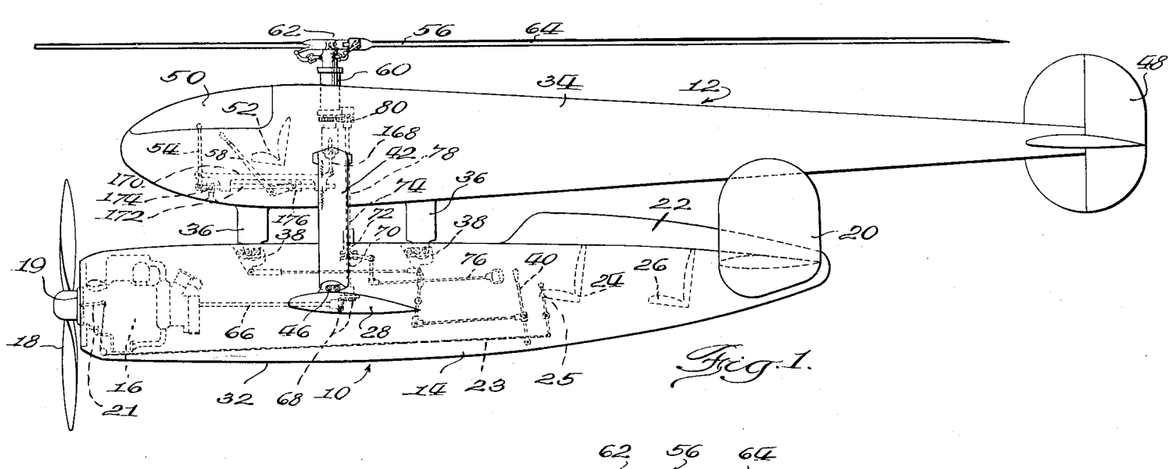
Fig. 1 is a side elevation of a composite aircraft embodying the present invention.
Figures 1A, 3:
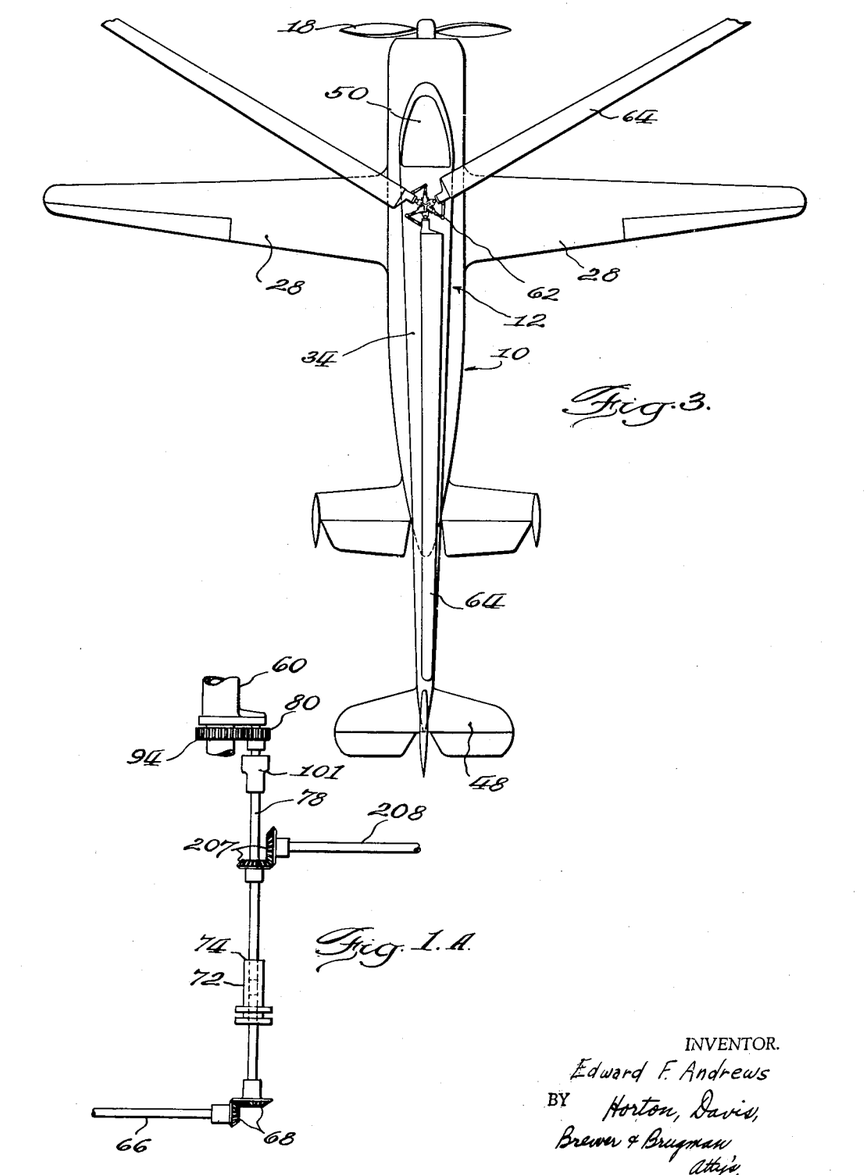
Fig. 1a is a diagrammatic representation of alternative mechanism to be substituted in the device of Fig. 1.
Fig. 3 is a plan view of the composite aircraft shown in Figs. 1 and 2.
Figure 2:
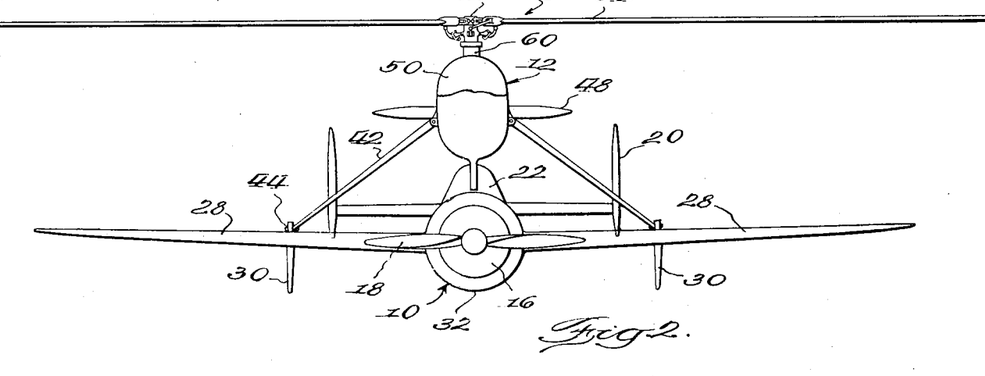
Fig. 2 is a front end elevation of the composite aircraft shown in Fig. 1.

The composite aircraft comprising the present invention may assume any one of several forms. Certain of these forms are completely shown in the drawings and some may combine certain features shown in one embodiment with other features shown in other embodiments. For instance, the variable pitch counter torque propeller shown in Fig. 6 may be combined with the embodiment of Fig. 1 and be driven from the engine in the airplane component, as indicated in Fig. 1a. Under these circumstances, the vertical and horizontal tail surfaces shown in Fig. 1 may also be retained, at least in part. I prefer the continued supply of a large amount of power from the motor to the rotating wing after the composite aircraft leaves the ground. This permits a long, continued vertical or near-vertical ascent and hovering flight, which facilitates take-off in the presence of high obstacles and facilitates control in restricted spaces with turbulent air. It also permits higher rotor loadings. The continued application of large power to the rotor after take-off requires that the torque reaction of the rotor be compensated for, for instance, by the torque compensating propeller illustrated, or by oppositely rotating rotors, etc. Power may be supplied to the rotor and torque compensating means either from the motor in the airplane component or from a motor in the rotor component, or the power of the motor in the airplane component may be added to that of the motor in the rotor component to drive the rotor from both power sources while the two components are locked together. If the airplane component is fast, it will have a large amount of power which will be available for take-off if applied to the rotor. When larger power is available, a rotor of smaller diameter may be employed which is less cumbersome and easier to construct. If no motor is employed in the rotor component and the rotor is driven solely by the motor in the airplane component, the rotor component becomes cheaper, simpler, and will be very light for landing after separating from the airplane component. In this arrangement, the disc loading of the rotor may be made very high during the take-off of the composite aircraft, as it will be greatly reduced after separation of the airplane component from the rotor component, thus providing a much lower sinking speed for landing without power. Certain embodiments of my invention present advantages for different types of service. However, since certain features of the invention are common to all of the embodiments, the simplest from a structural standpoint will be described in detail first. This arrangement, which is shown in Figs. 1, 2 and 3 has an assist take-off component of the auto-rotating type. It is comprised essentially of an airplane component 10 and a take-off rotor component 12. The airplane component is comprised of a fuselage 14 equipped at its forward end with an engine 16 which drives a propeller 18. Although in the interest of simplicity of illustration it is not shown in detail, this propeller engine combination may include a manually controllable clutch 19 of any suitable type having any suitable control mechanism, such as the lever 21, the cable 23, and the lever 35, by means of which the pilot can effect its engagement and dis-engagement so that the propeller can be connected to the engine or not, as desired. At its rearward end, the fuselage 14 is provided with an empennage 20 of the double rudder type, while in front of this empennage and closely adjacent thereto, a cockpit 22 is provided for two crew members, who occupy seats 24 and 26. This fuselage 14 is equipped with wings 28 which are of comparatively high aspect ratio and which are of such a size that when the aircraft is loaded, the wing loading is comparatively high, for instance, 80 pounds per square foot or even higher.

These wings are attached to the fuselage at approximately its mid-point from top to bottom and are equipped with retractable skids 30 at a point approximately one-third of the span outwardly from the fuselage. These skids are preferably connected with the wing bar by hinges at their forward ends and fold backwardly into slots when retracted and extend downwardly at an angle to the vertical when extended. Preferably, they are equipped with proper shock absorbing mechanism of sufficient capacity to prevent the aircraft from tilting to one side sufficiently to drag a wing. Since practically all of the weight in landing is taken upon the lower surface of the fuselage, the shock absorbers associated with the skids 30 need not be of very high capacity.

A skid or reinforcing member 32 is attached to the lower surface of the fuselage and extends along so much of the length of the fuselage as comes into contact with the ground in landing. Although in the embodiment shown, the skid is illustrated as being merely a simple shoe which reinforces the fuselage and takes the actual ground contact, it will be appreciated that if desired, this skid can be retractable and extensible and that it can be provided with shock absorbing mechanism. It will be appreciated further that a skid arrangement such as that described will arrest the landing run of the aircraft comparatively quickly and will have safety features not found in conventional landing gear arrangements, since the center of gravity of the present aircraft is brought much closer to the ground at the moment of landing.

The rotor component 12 includes a fuselage 34 of somewhat greater length than the fuselage 14. It is arranged in longitudinal alignment with the airplane fuselage 14 and is attached thereto by means of downwardly extending struts 36 or other suitable means. These struts at their lower ends are equipped with connector elements which mutually cooperate with complementary connector elements 38 within the airplane fuselage 14 so that by the movement of a control lever 40, the crew member in the front seat 24 can attach his airplane to the ends of the struts 36 or can disconnect his airplane from these struts at will.

Bracing struts 42 extend obliquely downwardly from the sides of the fuselage 34 and at their lower ends abut against stops 44 upon the upper surfaces of the wings 28 when the fuselage 34 is attached to the airplane member 10. If desired, the lower ends of the struts 42 may be equipped with rollers 46 which enter from the rear into slots in the stops 44. These struts 42 are hinged to the sides of the fuselage 34 and are urged downwardly by springs, rubber shock cord, or other resilient means, so that they press against the upper surface of the wing 28 and prevent the fuselage 34 rocking relative to the airplane 14. These struts 42 also serve to take the shock and maintain the rotor component 12 in an upright position when this component is landed after detachment from the airplane 14.

At its rearward end the fuselage 34 carries an empennage 48, while at its forward end it is provided with a transparent enclosure 50 behind which the operator's seat 52 is located. Directly in front of the seat 52, a control stick 54 is positioned and by mechanism to be described presently, this stick is used by the operator to control a rotating wing 56. This stick may be employed to exert control over the composite aircraft when the two elements are connected and it is also employed to control the flight of the rotor component after it has separated from the airplane component. It will be understood that the rotor component is controlled in the same way whether it has no motor of its own but merely glides back to its base after separation, according to the embodiment of Fig. 1, or whether it is equipped with its own power plant, according to the embodiment of Fig. 6 or Fig. 9. It will also be understood that the airplane component is equipped with a normal complement of controls for pitch, roll and yaw, and that these may also be employed to control the composite aircraft while the two units are connected together. Further, if desired, the controls of the two components can be linked together so as to be operated simultaneously for control of the composite aircraft. A second control member which comprises a lever 58 is positioned alongside the seat 52 and is used by the operator to change the angle of attack of all the rotor blades simultaneously to increase or decrease the lift. This lever is used by the operator to feather the blades when the rotor is being overspeeded on the ground, to change the angle of attack of the blades for jump take-off, and to increase the angle of attack of the blades at the moment of landing so as to reduce the landing shock. The control stick 54 is used by the operator for pitching and rolling control and may also provide yaw control. However, a conventional set of rudder pedals and a rudder, not shown, may be provided to afford yawing control, if desired.

The fuselage 34 is provided with a rotor mast 60 which extends upwardly in a vertical direction above and slightly forward of the center of gravity of the rotor and airplane components 12 and 14. This mast carries a rotatably mounted rotor hub 62 at its upper end and this hub in turn is equipped with blades 64.

A shaft 66 driven by the motor 16 extends rearwardly and is connected by means of bevel gears 68 to a vertically extending shaft 70 equipped at its upper end with one element 72 of a clutch. This clutch element may be selectively connected to or disconnected from a complementary clutch shaft element 74 by a control rod 76 positioned within reach of the pilot in the seat 24. The clutch element 74 is connected to the lower end of a shaft 78 which extends downwardly from the rotor component 34 and is connected at its upper end to a gear train 80 which drives the rotor head 62. Thus the operator in the airplane component 14 can connect the engine 16 to the rotor 56 by means of the control 76 so as to bring the rotor up to take-off speeds. Then by movement of the control 76, the engine 16 can be disconnected from the rotor head 62 at the take-off or upon separation of the two components.

In use, the rotor component 12 may be hoisted into position by means of a crane or other suitable device and is attached to the airplane component 14 by manipulation of the control lever 40, the load is disposed within the airplane element 10, the crew members take their places, the clutch 19 shown, for connecting the propeller 18 to the engine 16 is disengaged to prevent rotation of the propeller 18, and the engine 16 is started. After the engine has warmed up to operating temperature, it is connected by means of the clutch members 72 and 74 through manipulation of the control 76 so that the engine drives the rotor 56. Before the rotor is brought up to speed, the lever 58 is moved into such a position that the blades 64 are reduced to substantially zero angle of attack. The rotor is then brought up to a speed considerably in excess of normal flying speed, whereupon the pilot in the seat 24 by manipulation of the control lever 76 may disconnect the engine 16 from the rotor 56. The pilot in the seat 52 then moves the lever 58 to increase the angle of attack of the blades 64, thus causing the composite aircraft to rise vertically. When the airplane component 10 has cleared the ground sufficiently to permit the free rotation of the propeller 18, the clutch 19 is engaged, thus connecting the propeller 18 to the engine 16 and the engine is accelerated to give the composite aircraft a forward thrust so that it will attain flying speed about the time that the top of its jump is reached. After a considerable height is attained, the pilot in the seat 52 may exert a slight climbing control on the component 12. The pilot in the seat 24 may then exert a slight diving control on the component 10, and thereupon pull backward the lever 40 to release the component 10 from the component 12. The opposite controls applied to the two components will aid in effecting their quick and positive separation.

The pilot in the seat 52 then returns the rotor component 12 to the landing field by manipulation of the stick 54 and the rudder pedals, not shown. Since the weight of the airplane component 14 has been removed from the rotor 56, the rotor blades 64 will be very lightly loaded and the rotor component 12 will therefore land slowly wherever desired within its gliding range.

Figure 6:
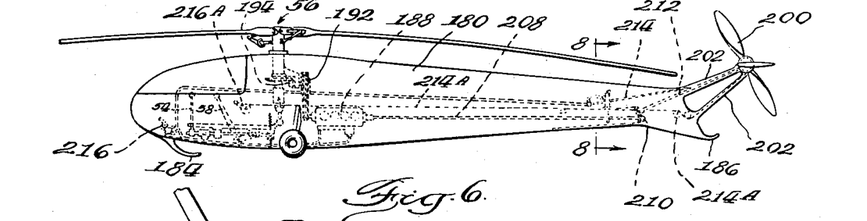
Fig. 6 is a somewhat diagrammatic side elevation of a helicopter embodying features of my invention. This helicopter mechanism may also function as the rotor component of my composite aircraft.
Figures 7, 8, 9, 10:
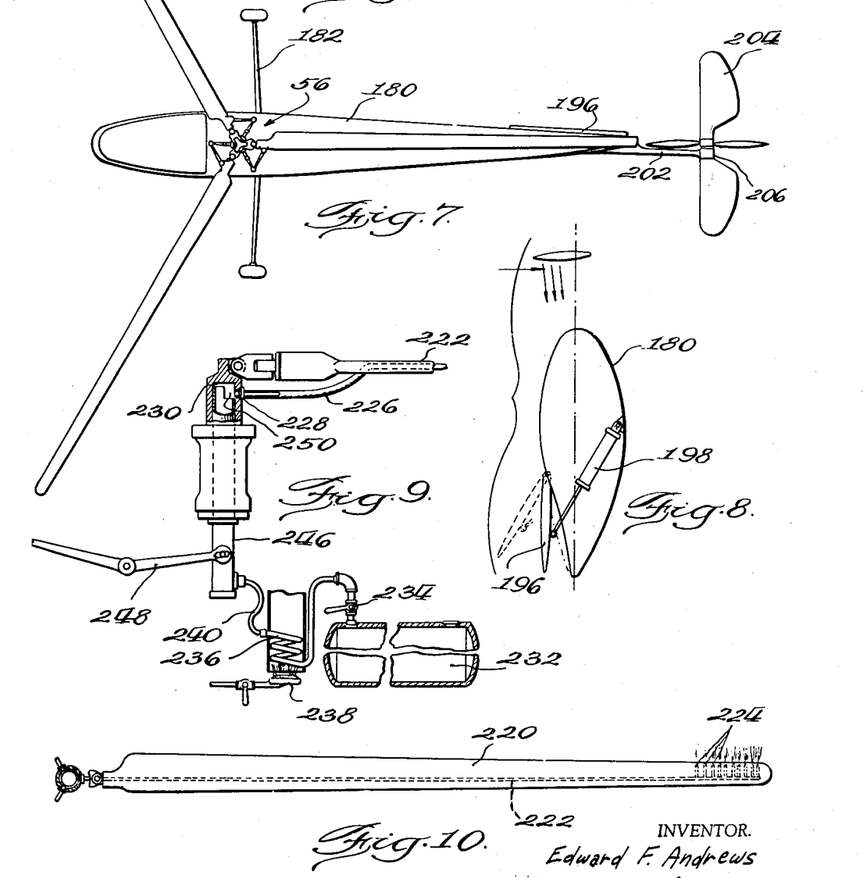
Fig. 7 is a plan view of the aircraft shown in Fig. 6.
Fig. 8 is a vertical sectional view which may be considered as having been taken in the direction of the arrows substantially along the line 8—8 of Fig. 6.
Fig. 9 is a diagrammatic representation of a rotor and an arrangement for supplying power to the rotor without imposing torque reaction upon the aircraft fuselage.
Fig. 10 is a somewhat diagrammatic plan view of one of the blades of the aircraft rotor shown in Fig. 9.

It will be understood that the above procedure may be varied somewhat, for instance, if desired, the engine 16 may be kept connected to the rotor 56 so as to apply a limited amount of power from the motor directly to the rotor during the climb. However, the clutch member 72 should be disconnected from the clutch member 74 before separation of the two components. It will also be understood that when a rotor component, such as that shown in Fig. 6 or Fig. 9 is employed, the independent power source of the rotor component will be applied to the rotor to give the maximum assistance in take-off and also in climb, if desired. When the rotor component contains its own source of power, this power can be employed during the flight of the rotor component after it has separated from the airplane component.

When the airplane component 14 returns from its mission with the major portion of its fuel supply exhausted, and additionally lightened by the amount of its discharged load, (its bomb, for instance) it maneuvers into position and glides toward the landing area. Before contact with the ground, the propeller 18 is maneuvered into a horizontal position and stopped by means of the propeller clutch 19 or any other suitable arrangement, the skids 30 are lowered and the airplane glides in and lands upon the skid 32 while its wings are kept out of contact with the ground by the skids 30.

Figure 4:
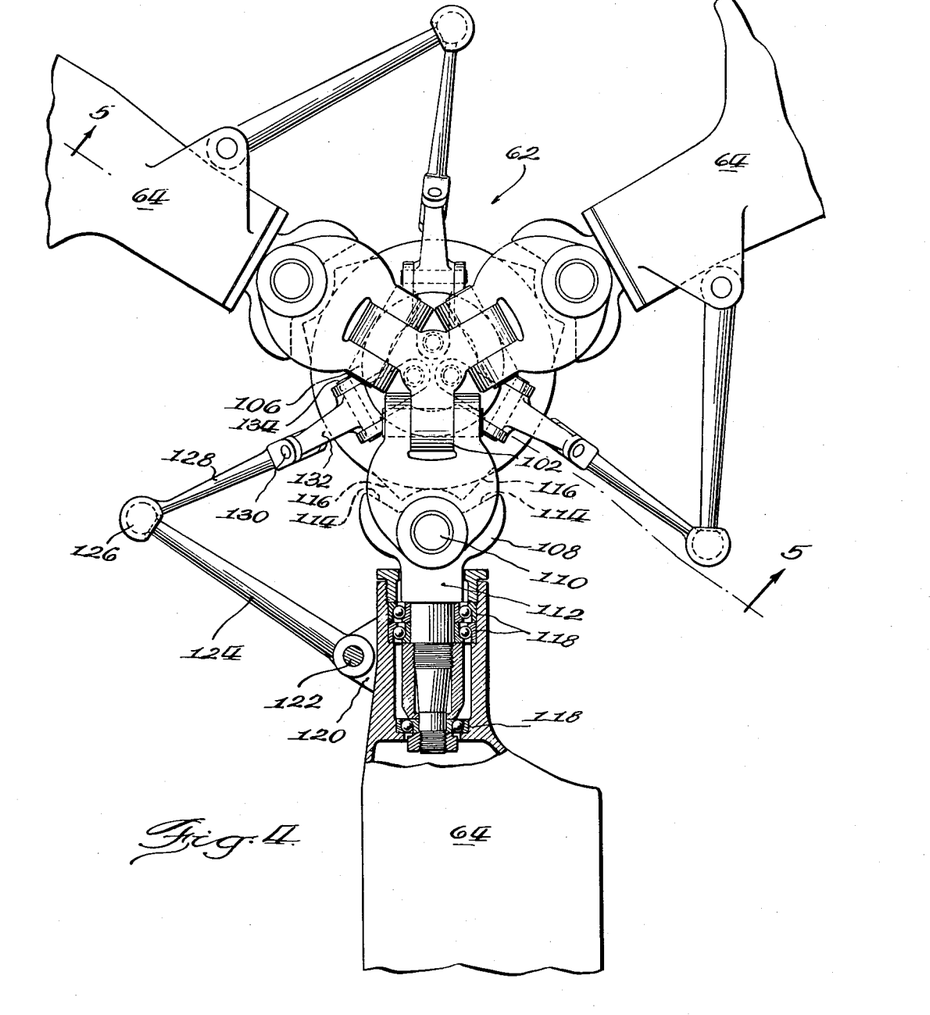
Fig. 4 is a plan view of a rotor head embodying features of my invention. In this view a portion of one of the rotor blade roots is shown in longitudinal section, better to illustrate the interior construction.
Figure 5:
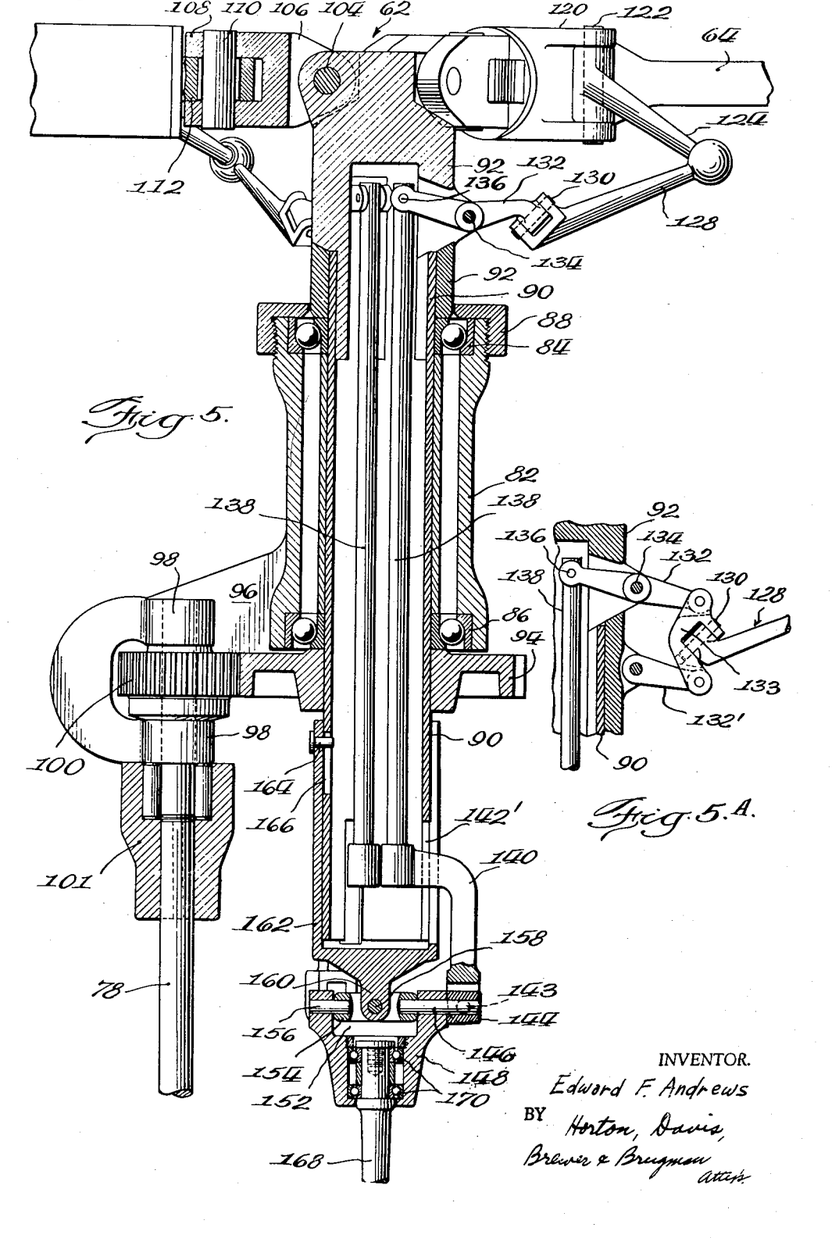
Fig. 5 is a vertical sectional view through the rotor hub shown in Fig. 4, showing the blade control linkage and the driving gear.

Referring to Figs. 4 and 5 which show the rotor head 62 in greater detail, it will be seen that this head carries three articulated blades 64 and is mounted to rotate freely relatively to the fuselage 34. As seen in Fig. 5, a tubular member indicated by the numeral 82 is secured to the fuselage 34 in Fig. 1 or to the fuselage 180 in Fig. 6 and serves to transmit the lift from the rotor to the rotor component 12 which in turn lifts the airplane component 14. The member 82 may be formed as a machined forging and carries radial thrust anti-friction bearings 84 at its upper end and a second set of similar anti-friction bearings 86 at its lower end. The bearings 84 and 86 fit within recesses in the ends of the tubular member 82 and the upper of these bearings 84 is secured in its seat by an annular threaded cap 88. The inner races of the bearings 84 and 86 carry a tube 90, the upper end of which is secured to a forged head 92. The lower end of this head rests against the end of the inner bearing race of the upper bearing 84 and transfers the weight of the rotating wing to this inner race. Beneath the lower bearing 86 a gear 94 is secured to the tube 90 and bears against the inner race of the bearing 86 and transmits the lift to this bearing member when the aircraft is in flight.

At one side, the tubular member 82 is formed to provide a bracket 96 which at its ends provides bearings 98 for the shaft 78 previously mentioned as the shaft for transmitting power from the engine 16 to the rotor. This shaft 78 carries a gear 100 meshed with the gear 94 by means of which the tubular member 90 is rotated from the shaft 78. Preferably the shaft 78 should include a suitable overrunning clutch, such as the cam and roller type clutch 101, so that power can be applied to the rotor in only one direction, thus permitting free wheeling of the rotor in the event of a power failure. No detailed description of this clutch 101 is necessary since overrunning clutches are well known.

The rotor head 92 is formed at its upper end to provide three equally spaced radial ears 102 which carry horizontal hinge pins 104 to which in turn the yokes 106 are pivoted. Each of these yokes is formed integrally with a second yoke 108 which carries a vertical hinge pin 110 to which is pivoted the inner end of a spindle 112. Thus the spindle can move vertically about the hinge pin 104 and can move horizontally about the hinge pin 110. In order to limit the horizontal motion of the spindle 112 about the vertical pin 110, resiliently faced stops 114 are formed integrally with this spindle and impinge against co-operating stop members 116 formed integrally with the yoke 108. Each of the spindles 112 journals the root end of a blade 64 upon an anti-friction bearing set 118. This bearing set 118 is made up of two inner bearing members placed back to back which carry the thrust developed by the centrifugal force of the rotating blades, while an outer bearing member 118 locates the blades and opposes forces in the opposite direction.

The above described mounting of the rotor blades, it will be appreciated, permits movement of these blades in any direction. That is, they can move upwardly or downwardly, they can move from side to side, or they can rotate about their longitudinal axes.

Each of these blades is provided at its root with a pair of outwardly extending ears 120 positioned ahead of the leading edge. As shown in Fig. 4, each set of these ears carries a vertically mounted hinge pin 122. It must be appreciated, however, that although this pin is shown as vertical in this view, the actual position of the pin will depend upon the angle of attack of the blades 64, since these pins move with the blade. These pins in turn serve to pivot control arms 124 which extend somewhat downwardly and generally tangentially to a circle about the center of rotation of the hub 92.

At their other ends, each of these control arms is connected by means of a ball and socket joint 126 or other universal joint to an inwardly and downwardly extending arm 128, the opposite end of which is connected by means of a hinge pin 130 to a rocker arm 132 which extends through a slot in the hub 92. The hinge pin 130 is shown as inclined so that its lower end is closer to the center of rotation of the hub than its upper end, while the rocker arm 132 is pivoted at approximately its midpoint about a horizontal hinge pin 134 secured to the head 92. These hinge pins are so located that the rocker arms 132 extend radially outwardly from the hub at a point approximately midway between adjacent blades 64, while the linkage arrangement is such that each of the rocker arms 132 is connected to the next rearwardly adjacent blade 64 with reference to the direction of rotation of the hub 92.

With the pin 130 sloping outwardly and upwardly, as shown in the drawing, and with the longitudinal axis of the blade 64 occupying a radial position passing through the axis of rotation, the angle of the blade 64 will decrease by rotation around the bearing set 118 when the blade swings backwardly through a small angle and will increase again when the blade swings backwardly through a larger angle.

When the blade swings forwardly around the pin 110 from a radial position, the angle of the blade will also increase by rotation around the bearing set 118. This is because the arm 128 is located ahead of the radial position, that is, ahead of a radius drawn through the axis of rotation and through the axis of the pin 130 when the longitudinal axis of the blade 64 occupies a radial position. The ball joint 126 at the end of the arm 128 will rise as the arm 128 swings to either side of its radial position. The position of the arm 128 relative to the radial position of the longitudinal axis of the blade 64 may be established by properly selecting the length of the arm 124. The characteristics provided by the arrangement shown in Figs. 4 and 5 will increase the angle of attack of the blade when the blade swings forwardly of its radial position and will decrease its angle of attack when it swings backwardly relative to its radial position through a moderate angle. This effect may be employed to increase the drag of the blade if it is displaced forwardly and to decrease the drag of the blade if it is displaced rearwardly, thus tending aerodynamically to stabilize the blade and maintain it close to its radial position. However, when torque is applied to the hub to drive the blades as in a helicopter, the blades will tend to swing backwardly sufficiently far to displace the arm 128 to the rear of its radial position. This will increase the angle of attack of the blade and will cause it to absorb the greater torque without a substantial increase in the rotational speed.

Also, if the power applied to the hub is suddenly interrupted, as for instance by the stoppage of the motor, the blades 64 would swing forwardly to the radial position, at which point their angle of attack may be such as to provide good auto-rotational characteristics. Thus, the rotational speed of the rotor and its lift would automatically be preserved. It will thus be seen that the application of power automatically increases the blade angle to that desired for helicopter operation, while the interruption of the power drive automatically causes the angle of attack to change to an angle of around 4°, suitable for auto-rotational flight.

It should be understood that the rocker arm 132 and the arm 128 may be so constructed as to give any desired angle in any desired plane of the pin 130, thus securing a desired relation to give a proper change in the angle of the blade around the bearing set 118 with a given swing of the blade forwardly or backwardly around the pin 110.

Further variations may also be produced by changing the relation between the radial position of the arm 128 and the radial position of the blade 64.

It should here be pointed out that the angle of the pin 130 changes with the movement of the rocker arm 132 around its axis 134, the latter resulting from control displacements. When the outer end of the arm 132 is in its lowermost position, the angle of the pin 130 will be largest relative to the axis of rotation. Thus, in this position, a greater change of angle of the blade 64 around the bearing set 118 will occur with a given swing of the blade forwardly or backwardly around the pin 110 than when the outer end of the pin 132 is in its uppermost position and the angle of the pin 130 relative to the axis of rotation is correspondingly smaller. This change effected by control displacement may have advantages when particular control effects are desired.

In Fig. 5a a modification is shown wherein because of the parallelogram arrangement there provided by the arms 132 and 132' and the link 133, the angle of the pin 130 changes very little with control displacement. This arrangement may be preferable when certain other control characteristics are desired. In Fig. 5a, parts corresponding to similar parts in Fig. 5 are given corresponding numbers.

It should also be understood that the axis of the pin 130 in the embodiment of either Fig. 5 or Fig. 5a may be made approximately parallel to the axis of rotation when little or no change of blade angle with forward or backward swinging movements around the pin 110 is desired. The angle of the pin 130 may also be given a forward or backward inclination relative to the direction of rotation of the hub. Thus, other characteristics advantageous for certain purposes may be imparted to the rotor. From the above it will be appreciated that this invention is directed more specifically to the particular means of securing any desired characteristic through an inclination of a joint between the control mechanism and the feathering blade than toward the selection of a particular characteristic, since the particular characteristics desired in any particular aircraft are largely influenced by other features incorporated in the aircraft and by the type of service for which it is intended.

The inner end of each of the rocker arms 132 is connected by a horizontal hinge pin 136 to the upper end of a vertically extending control rod 138, the lower end of which is attached to an L-shaped bracket 140. These brackets extend outwardly through slots 142 in the side walls of the tube 90 and thence downwardly where their lower ends are pivoted to horizontal pins 143 positioned tangential to a circle about the center of rotation of the rotor head. The pins 143 in turn pivot in blocks 144 secured to the outer ends of radially extending pins 146 which at their inner ends are secured in an inverted cup-shaped member 148. At its inner end one of these pins 146, which is somewhat longer than the other three, extends into a recess 152 in the cup 148 and is journaled through the edge of an annular ring-like member 154, while in alignment with this long pin 146, a short pin 156 similarly extends from the cup 148 into the ring 154, so that the ring is journaled to pivot about these two pins. This ring in turn has a transverse pin 158 located at right angles to the center line of the long pin 146 and the short pin 156. The transverse pin 158 in turn passes through and is journaled in a downward extension 160 formed integrally with a sleeve 162 which telescopes around the lower portion of the tube 190. This sleeve 162 is free to move upwardly and downwardly over the surface of the tube 90 but is prevented from rotating relative to the tube by pins 164 which extend through the side walls of the sleeve 162 into vertically extending slots 166 cut in the tube 90.

The cup 148 is provided with a downwardly depending control lever 168 about which the cup 148 can revolve on antifriction bearings 170 although no other relative movement between the lever 168 and the cup 148 can take place.

Referring to Fig. 5, it will be seen that if the lower end of the control lever 168 is moved toward the right, as shown in the figure, the cup 148 will be pivoted about the pin 158 so as to raise the lower end of the L-shaped arm 140 shown in this figure. As this L-shaped arm is raised, it in turn raises the right hand control rod 138 and rocks the outward end of the rocker arm 132 that shows in this figure downwardly. This in turn causes the general downward movement of the arm 128, the arm 124, and therefore the leading edge of the wing 64 to which the arm 124 is pivoted. Simultaneously, the opposite side of the cup 148 will be rocked downwardly and thus the other two control rods 138, only one of which shows in this figure, will be moved downwardly a somewhat smaller distance than the right hand rod 138 is moved upwardly since their point of connection to the cup 148 is not as far from the pivoting axis around the pin 158 as is the similar connection between this cup and the right hand rod 138. The effect of this will be to cause an increase in the angle of attack of the other two blades 64.

Now as the rotor head rotates, it will carry with it the tube 90, the rods 138, the L-shaped members 140 and the cup 148. Thus if the control lever 168 is held to the right, for instance, as viewed in Fig. 5, the effect upon the rotor will be to cause each arm 128 progressively to move downward and to decrease the angle of attack of its blade as it moves toward the position in which the lower end of the lever 168 is held and to progressively move upward the arm 128 and increase the angle of attack of its blade as it moves away from this position. Therefore, if the lower end of the lever 168 is moved toward the rear of the aircraft, the arms 128 will be lowered as they approach the rear of the aircraft, and will be raised as they approach the front of the aircraft, thus causing the nose of the aircraft to rise, thereby putting the aircraft into a climbing attitude. Similarly, forcing the lower end of the lever 168 forwardly causes the airplane to go into a diving attitude, while moving the lower end of this lever toward the right causes the aircraft to roll to the right, while a similar movement of the stick to the left will cause the aircraft to roll toward the left. Of course, any position assumed by the lever which combines movement about two of these axes, such as movement of the lever toward the rear and toward the left will cause the aircraft to seek an attitude which is a combination of these two effects. For instance, with the lever in the above position, the aircraft would seek a climbing attitude and would roll toward the left. It may be here pointed out that as each rocker arm 132 is positioned centrally between two blades 64 and is operatively connected to the rearwardly adjacent blade, the arm 132 leads the blade 64 to which it is connected through the arm 128 and the arm 124 by 60°. Thus, the control forces applied to the arm 132 will lead the change of angle of the blade 64 resulting from a control displacement by 60°. Generally speaking, the change in angle of the blade 64 resulting from a control displacement may occur 90° in advance of the position at which the blade 64 flaps upwardly or downwardly to the greatest extent. However, this angle of control advance may be varied to a considerable extent, depending upon the characteristics desired. The angle of control advance of 60° shown in the accompanying figures is a practical arrangement which may be used for purposes of illustration, although it will be understood that different angles of advance within a practical range may be employed, if desired.

If the lever 168 is pushed straight upwardly, all of the control rods 138 will be raised an equal amount and the angle of attack of all of the blades 164 will be decreased the same amount. Thus, the lift of the rotor is decreased. Conversely, downward movement of the lever 168 will cause the angle of attack of the blades to increase and will increase the lift of the rotor.

Referring to Fig. 1, it will be seen that the lower end of the lever 168 is connected to a longitudinally extending sliding and rocking member 170 which at its forward end is pivotally connected to the control stick 154. The sliding and rocking member 170 slides upon and rocks about a cylindrical rod 172 which has its forward end mounted to pivot in a bracket 174 attached to the aircraft fuselage so that the rearward end of the rod 172 can be raised. This rod near its rearward end is provided with a sliding block 176 pivotally connected to an offset extension of the control lever 58 so that when the control lever 58 is pushed forwardly, the rearward end of the rod 172 will be raised while when the control lever 58 is moved backwardly the rearward end of this rod will be lowered.

It will be understood that the rear end of the rod 172 may be biased toward a neutral position by means of springs attached thereto so that if the lever 58 is released, the springs will bias the rod 172 to a position corresponding to a mean angle of incidence of all of the blades 64 suitable for auto-rotation; for instance, a positive angle of about 4° relative to a plane perpendicular to the axis of rotation of the rotor. A notched sector may also be provided for the lever 58 whereby engaging a detent on the lever with any desired notch in the sector will hold the lever 58 securely in any desired position.

Since the rocking and sliding member 170 is connected at one end to the control stick 54 and at its opposite end to the control lever 168, it will be seen that when the upper end of the stick 54 is pulled rearwardly, the lower end of the lever 168 will be moved rearwardly. Similarly, forward or side-to-side movement of the upper end of the control stick 54 brings about similar forward or side-to-side movement of the lower end of the control lever 168. Thus it will be seen that movement of the control stick 54 controls the rotor 56 so that the attitude assumed by the aircraft is similar to that assumed by a conventional airplane upon similar control stick movements. It will also be seen that movement of the lever 58 forwardly causes substantially straight upward movement of the control lever 168, thus decreasing simultaneously the angle of attack of all the rotor blades, while rearward movement of the control lever 58 increases the angle of attack of all of the blades simultaneously. The foregoing applies equally to the embodiments illustrated in Fig. 1 and Fig. 6.

In Figs. 6 and 7 I have shown a helicopter provided with a rotor of the type above described. It may be employed as the rotor component of the composite aircraft previously described or it may be operated independently. This helicopter comprises a fuselage 180 equipped with a rotating wing 56, a control stick 54 and a control lever 58, all similar to those shown in Fig. 1. The stick 54 and the lever 58 are connected to control the rotor in the same manner as shown in Fig. 1 and a description of this control mechanism therefore will not be repeated. The fuselage also carries a retractable landing gear 182 and forward and rearward skids 184 and 186, respectively, which prevent excessive tilting of the aircraft on the ground. An engine 188 is provided in the fuselage and is connected by means of a multiple V-belt drive 190 to a pulley 192 which drives the rotor through a gear train 194.

In order more or less completely to offset the torque reaction of the rotor 56, the rearward portion of the fuselage is formed of airfoil section as may best be seen in Fig. 8 so that the air stream moving downwardly from the rotor will react upon the fuselage and cause the fuselage to tend to move in a direction opposed to the rotor torque reaction. In order to enhance this effect, a portion of the fuselage on the side toward which the blades swing is formed as a separate member 196 and is hinged at its upper edge so that it can be moved outwardly by a hydraulic cylinder 198, thus increasing the lift of the airfoil section, and thereby increasing the force tending to offset that produced by the rotor torque.

Although the above described arrangement will offset a considerable portion of the rotor torque, or even all of it under certain flight conditions, it may not offset all of the torque under other flight conditions, especially at zero or low forward speeds. Supplementary means are therefore provided to counteract the additional torque. This supplementary means comprises a propeller 200 outrigged behind and above the fuselage upon a pair of hollow struts 202. These struts also carry elevators 204 which are mounted upon a tube extending through a bearing member 206 carried by the struts 202. The propeller 200 is mounted to rotate about a sidewise extension of the bearing member 206, thus making it unnecessary to position the propeller a considerable distance away from the elevators to provide clearance between the elevators and the tips of the propeller blades. The propeller is mounted so that its slip stream blows away from the struts 202, not against them.

The propeller 200 is driven through a shaft 208 connected at its forward end to a power take-off at the rearward end of the motor 188 and through bevel gears 210 at its rearward end to a second shaft 212. This second shaft 212 extends obliquely upwardly through the upper one of the struts 202 and at its upper end drives the propeller 200 through a second pair of beveled gears, not shown. The propeller 200 is of the hydraulically actuated adjustable pitch type and a hydraulic control pipe 214 for providing the necessary adjustment extends downwardly through the upper strut 202 and forwardly to the rudder bar 216 located in front of the pilot's seat. Thus, by pressing the right foot on the rudder bar 216, the pilot can increase the pitch of the propeller 200 and by pressing with the left foot decrease it, and in general determine the thrust of this propeller for any given engine setting. Since the propeller 200 is driven by the same engine as the rotor 56, it will be appreciated that normally a decrease or increase in the power output of the engine will produce a simultaneous increase or decrease in the torque reaction of the rotor and the opposing thrust of the propeller 200. The variation that occurs with change of pitch of the rotor between the torque reaction upon the fuselage of the rotor 56 and the thrust at the end of the fuselage from the propeller 200 can be compensated for by movement of the rudder bar 216, which by means of a suitable arrangement permits oil to enter or be exhausted from the hydraulic cylinder 198 and the hydraulic control of the propeller 200, thus changing the pitch of the propeller 200 and moving the flap 196 inwardly or outwardly.

In general the hand crank 216A connected by the cable 214A to the adjustable stabilizer 204 will be used to trim the aircraft much in the same manner as the conventional adjustable stabilizer or trimming tab is used to trim a conventional airplane, while the control adjustments necessary for maneuvering will be provided by manipulation of the control stick 54. When the control lever 58 is moved so as to change the angle of attack of the rotor blades, means connected thereto may be provided to adjust the rudder bar so that it will have a central position with the changed torque.

If it is desired to incorporate the helicopter advantages shown in Fig. 6 with the single engine drive shown in Fig. 1, an arrangement such as that shown in Fig. 1A may be used in place of the engine and related mechanism shown in Fig. 6. That is, the engine of the airplane component drives shaft 66 which, through gears 68, shaft 78, overrunning clutch 101, and gears 80 and 94 drives the rotor, all as shown in Fig. 1. A power take-off from the shaft 78, comprising the gears 207 transmits power from the airplane engine to the shaft 208 which, as shown in Fig. 6, drives the propeller 200. With this arrangement, the composite aircraft can be taken off and flown as a helicopter. When the two components are separated, the rotor component returns to its base and effects a landing thereat while operating as an autogyro. This arrangement obtains the advantages of vertical assist take-off without the complications inherent in the use of two separate engines. It also makes available for vertical ascent the extremely powerful engine normally to be found in a high speed airplane. It is apparent, further, that since only one engine needs to be lifted, there will be an appreciable weight saving and that because of the great power available the rotor can be of reduced diameter.

In Figs. 9 and 10, I have shown an arrangement for driving the rotating blades of a helicopter without producing torque reaction upon the aircraft fuselage. With such an arrangement no torque compensating mechanism such as that shown in Figs. 6, 7, and 8 is necessary and thus the arrangement shown in Figs. 9 and 10 is particularly adapted for use with an aircraft of the type shown in Figs. 1, 2, and 3 to provide additional power for take-off, return flight to the base, and to effect a landing thereat without requiring the complications that are inherent in a system of engine rotor drive.

As shown in Fig. 10, each of the blades indicated by the numeral 220 of the rotating wing has a heat insulated tube 222 extending longitudinally therethrough. Near the wing tip this tube is connected to one or more rearwardly directed jets 224. The inner end of each of these tubes is connected by means of flexible heat insulated tubing 226 to a fitting 228 extending through the side wall of a cylindrical chamber 230 that forms a portion of the rotor head. Thus steam or other gaseous medium fed to the chamber 230 will pass outwardly through the tubes 226 and 222 and will issue from the jets 224 in such a manner that the reaction from these jets will cause the leading edge of the rotating wing to advance.

A heat insulated tank 232 of superheated liquid is located within the aircraft and is connected by means of a valve 234 to a coil 236 so located that it can be heated by the flame from a burner 238, so that the steam issuing from the tank 232 is super-heated. This burner increases the energy and efficiency of the jet propulsion system and dry super-heated steam issues from the coil 236. The opposite end of this coil 236 is connected by means of a piece of flexible heat insulated tubing 240 to heat insulated vertical hollow cylindrical member 246, the upper end of which fits within the chamber 230. This cylindrical member 246 is connected to a pivoted lever 248 under the control of an operator so that the operator can raise or lower the cylindrical member 246 by movement of this lever.

At its upper end, a considerable portion of one of the side walls of the cylindrical member 246 is removed, thereby providing an aperture or notch 250 in the tube wall opposite the inner ends of the fittings 228. The upper portion of the cylindrical member 246 therefore serves as a control valve which permits steam to enter a tube 226 when its rotating wing is in a position opposite the notch 250, while when the rotating wing is adjacent that portion of the cylindrical member which has not been notched, no steam can reach its tube 226.

The notch 250 of the cylindrical member 246 is so oriented that this notch is on the side of the aircraft upon which the rotating wing is advancing in the direction of forward flight. This arrangement provides a means for shutting off the flow of steam to the jets 224 excepting when the wing to which the jets are fitted is upon the side of the aircraft where the wing is traveling at the highest speed relative to the air stream. This is advantageous because jet propulsion is not efficient when the object to which the jet is attached is traveling at a low speed relative to the speed of the medium issuing from the nozzle, but jet propulsion increases greatly in efficiency when the velocity of the nozzle approaches the velocity of the jet. Therefore when the aircraft is moving forwardly, greater efficiency can be obtained if the steam is emitted from the jets only during the interval while the relative speed between a wing tip and the moving air stream is the greatest.

When it is desired to take off an aircraft equipped with a rotor and rotor propulsion mechanism of the type described, the burner 238 is ignited, the valve 234 is opened to permit the superheated liquid or steam to enter the coil 236, the lever 248 is shifted so as to move the cylindrical member 246 downwardly sufficiently to bring the upper end of the cylindrical member 246 below the fittings 228. Thus steam is admitted continuously to all of the rotor jets 224, thereby providing the maximum power for quick take-off. Once the aircraft is in the air and has attained the normal flying speed, the expenditure of power necessary to maintain it at this altitude is less than that necessary to cause it to rise. Since ordinarily when the aircraft is flown at any certain altitude it is also moving forwardly, the control lever 248 is shifted so as to move the cylindrical member 246 upwardly sufficiently to cut off steam from the jets 224 in each rotor wing as it moves rearwardly relative to the air stream.

The notched portion 250 shown in Fig. 9 can be differently shaped than is there shown if different characteristics are desired. For instance, the notched portion 250 may be V-shaped so that by progressively moving the cylindrical member 246 upwardly, the jets 224 could be made to idle through progressively greater portions of each revolution.

From the above description of several embodiments of my invention, it will be seen that this invention accomplishes all of the objectives set forth for it at an earlier portion in this specification.

What I claim as new and useful and desire to secure by Letters Patent of the United States is:

1. A rotating wing aircraft having power means adapted to supply power for a limited period during take-off and landing, said power means comprising a pressure-resistant reservoir having a small external surface relative to its internal volume, substantially all of its external surface being heat insulated so as to minimize heat flow between the inside and outside thereof, the entire inner surface of which operates at a higher temperature than the outer surface, said reservoir containing a supply of liquid superheated without the application of heat to the exterior of said reservoir and adapted to provide expanding fluid pressure when released from said reservoir, a rotating blade having an orifice for the rearward discharge of fluid adjacent the blade tip, a fluid conduit connecting said orifice to said reservoir, and means to release said expanding fluid pressure from said reservoir into said fluid conduit.

2. A rotating wing aircraft having a fuselage and power means adapted to supply power for a limited period during take-off and landing, a high pressure fluid reservoir in said fuselage comprising pressure retaining walls insulated on all sides so as to minimize heat flow between the inside and outside thereof, the entire inner surface of which operates at a higher temperature than the outer surface, said reservoir containing a supply of liquid superheated without the application of heat to the exterior of said reservoir and adapted to provide expanding fluid pressure when released from said reservoir, a rotating blade having an orifice for the rearward discharge of fluid adjacent the blade tip, a fluid conduit including a pressure tight rotatable hollow hub connecting said orifice to said reservoir, and means to release said expanding fluid pressure from said reservoir into said fluid conduit.

3. In a rotating wing aircraft, a body, a heat-insulated pressure-retaining reservoir carried by said body, means for charging said reservoir with a liquid above its boiling point at atmospheric pressure without the application of heat to the exterior of said reservoir, maintaining the entire inner surface of said reservoir at a higher temperature than its outer surface during operation, a stationary sleeve member mounted on said body carrying bearing means, a hub member having a hollow interior rotatably mounted in said bearing means within said stationary sleeve member, a non-rotating hollow fluid transfer member extending into the hollow interior of said hub in close pressure sealing relation, a lifting blade carried by said hub, a fluid conduit within said blade, a fluid discharge orifice communicating with said conduit located adjacent the tip of said blade for rotating said blade by the reaction of a rearward fluid discharge, means connecting the interior of said hub with the fluid conduit in said blade, and fluid conducting means supplying fluid from said reservoir to the hollow interior of said fluid transfer member.

4. An aircraft having power means adapted to supply motive power therefor for a limited period, said power means comprising a heat-insulated pressure-resistant reservoir, having a small external surface relative to its internal volume, a superheated liquid contained within said reservoir maintaining the entire inner surface of said reservoir at a higher temperature than its outer surface during operation without the application of heat to said outer surface, an air foil blade mounted for rotation on said aircraft and having at least one rearwardly directed orifice adjacent the blade tip discharging vapor from said superheated liquid, and a hollow pressure-resistant vapor conduit extending radially through said blade and connecting said reservoir to said orifice.

5. An aircraft having power means adapted to supply motive power therefor for a limited period, said power means comprising a heat-insulated pressure-resistant reservoir, a superheated liquid contained with said reservoir maintaining the entire inner surface of said reservoir at a higher temperature than its outer surface during operation without the application of heat to said outer surface, an air foil blade mounted for rotation on said aircraft and having at least one rearwardly directed orifice adjacent the blade tip discharging vapor from said superheated liquid, a hollow pressure-resistant vapor conduit extending radially through said blade and connecting said reservoir to said orifice, and heat supply means for imparting additional heat to said vapor after discharge from said reservoir and before discharge from said orifice.

6. In a rotating wing aircraft having a fuselage, at least one air foil blade mounted for rotation on said fuselage and having at least one rearwardly directed orifice adjacent the blade tip, a heat-insulated pressure-resistant reservoir in said fuselage, said reservoir having a small external surface relative to its internal volume, a pressure-resistant conduit including a pressure-tight rotatable hub connecting said stationary reservoir in said fuselage with said rotating blade orifice, stationary means included in said conduit for effecting a pressure-tight seal with said rotating hub and for controlling the flow of fluid between said reservoir and said orifice, means for charging said reservoir with superheated liquid without the application of external heat to said reservoir and which is vaporized and the vapor discharged through said orifice to rotate said blade when said control means is operated to permit vapor discharge from said reservoir through said orifice.

7. In an aircraft, a hub mounted for rotation thereon, at least one propeller blade having at least one fluid discharge orifice adjacent the blade tip, a pressure-resistant reservoir fixedly mounted in said aircraft, said reservoir having a small internal surface relative to its internal volume, substantially all of its external surface being heat-insulated so as to minimize heat flow between the inside and outside thereof, a stationary conduit connected to said reservoir and to said hub by a pressure-sealing connection permitting relative rotation, a second conduit passing radially through said blade connecting said hub to said discharge orifice, valve means for controlling the flow of fluid in said stationary conduit, means for charging said reservoir with superheated liquid without the application of heat to the exterior of said reservoir, whereby when said valve means is opened steam is generated without external heat supply to said reservoir, said steam being discharged through said discharge orifice to rotate said propeller and propel said aircraft.

8. An aircraft having power means adapted to supply motive power therefor for a limited period, comprising a hub mounted for rotation on said aircraft, at least one propeller blade having at least one fluid discharge orifice adjacent the blade tip, a pressure-resistant reservoir fixedly mounted in said aircraft, said reservoir having a small internal surface relative to its internal volume, substantially all of the external surface being heat insulated so as to minimize heat flow between the inside and outside thereof, a stationary conduit connecting said reservoir to said hub by a pressure-sealing connection permitting relative rotation, a second conduit passing radially through said blade connecting said hub to said discharge orifice, valve means for controlling fluid flow in said stationary conduit, means for charging said reservoir with superheated liquid without the application of external heat, whereby when said valve means is opened and the pressure within said reservoir is reduced, said liquid is vaporized and said vapor is discharged through said discharge orifice to rotate said propeller blade and propel said aircraft.

9. A rotating wing aircraft, at least one propeller blade having at least one fluid discharge orifice adjacent the blade tip mounted for rotation thereon, a pressure-resistant reservoir, having a small internal surface relative to its internal volume, substantially all of its external surface being heat insulated so as to minimize heat flow between the inside and the outside thereof, a conduit connecting said reservoir to said fluid discharge orifice, valve means in said conduit, superheated water contained within said reservoir at a temperature substantially above its boiling point at atmospheric pressure, whereby when said valve means is opened steam is generated without external heat supply to said reservoir, said steam being discharged through said orifice, and heat supply means for imparting additional heat to said steam after discharge from said reservoir and before discharge from said orifice.

References Cited in the file of this patent

UNITED STATES PATENTS

| | | |
|---|---|---|
| 280,364 | Du Bois | July 3, 1883 |
| 1,344,661 | Strong | June 29, 1920 |
| 1,737,826 | Cabell | Dec. 3, 1929 |
| 2,799,353 | Andrews | July 16, 1957 |

FOREIGN PATENTS

| | | |
|---|---|---|
| 237,667 | Great Britain | Aug. 6, 1925 |
| 400,163 | Great Britain | Jan. 14, 1932 |
| 859,640 | France | Dec. 23, 1940 |

UNITED STATES PATENT OFFICE
CERTIFICATION OF CORRECTION

Patent No. 2,976,935            March 28, 1961

Edward F. Andrews

It is hereby certified that error appears in the above numbered patent requiring correction and that the said Letters Patent should read as corrected below.

Column 1, line 25, for "helicopers" read -- helicopters --; column 10, line 9, for "deisred" read -- desired --; column 14, line 46, for "fiittings" read -- fittings --; column 15, line 30, for "rela-" read -- relative --; column 16, line 24, for "with" read -- within --.

Signed and sealed this 29th day of August 1961.

(SEAL)
Attest:

ERNEST W. SWIDER
Attesting Officer

DAVID L. LADD
Commissioner of Patents